United States Patent

[11] 3,578,829

[72] Inventors Kotaro Hata
Nara-shi;
Toshikazu Fujii, Yao-shi, Japan
[21] Appl. No. 878,796
[22] Filed Nov. 21, 1969
[45] Patented May 18, 1971
[73] Assignee Matsushita Electric Industrial Co., Ltd.
Osaka, Japan
[32] Priority Nov. 26, 1968, Apr. 1, 1969
[33] Japan
[31] 43/86784 and 44/26382

[54] BOTTOM BRACKET FOR BICYCLE
7 Claims, 7 Drawing Figs.
[52] U.S. Cl.......................................... 308/179.5,
74/594.1
[51] Int. Cl...................................... F16c 3/06
[50] Field of Search........................... 74/594.1;
308/179.5, 189, 189.1, 207, 207.1

[56] References Cited
UNITED STATES PATENTS
628,791 7/1899 Germaine.................... 308/192

Primary Examiner—Martin P. Schwadron
Assistant Examiner—Frank Susko
Attorney—Stevens, Davis, Miller & Mosher ABSTRACT: A bottom bracket for bicycle having a pair of ball bearings for supporting a crankshaft, at least one of the bearings having an inner race slidable with respect to the crankshaft, and a coil spring urging the inner race of said one bearing against the steel balls to avoid chattering of the elements due to localized or irregular wear which would otherwise be produced on these members thereby to facilitate smooth rotation of the crankshaft.

INVENTORS
KOTARO HATA,
TOSHIKAZU FUJII

BY *Stevens, Davis, Miller & Mosher*
ATTORNEYS

3,578,829

BOTTOM BRACKET FOR BICYCLE

BACKGROUND OF THE INVENTION

FIELD OF THE INVENTION

The present invention relates to an improvement in a bracket lug for bicycle of the type that has at the opposite ends of the lug a pair of ball bearings for supporting therein a crankshaft whose opposite ends are adapted to receive thereon cranks with pedals, respectively.

SUMMARY OF THE INVENTION

It is an object of the present invention to provide a bottom bracket for a bicycle in which uniform pressure is imparted to all of the steel balls of the bearings to prevent the balls from being subjected to remarkable localized or irregular wear and flaking which would otherwise be produced due to pressure imparted locally to only a part of the balls and to localized portions of inner and outer bearing races, for thereby preventing chattering of the crankshaft in the bottom bracket and facilitating smooth rotation of the shaft.

It is another object of the invention to provide a bottom bracket having an outer bearing race rotatable with respect to the bracket so that the crankshaft is held in proper position irrespective of the accuracy of the bracket to facilitate smooth rotation of the shaft.

According to the present invention, there is provided a bottom bracket for a bicycle, said bracket comprising a pair of ball bearings at the opposite ends thereof for supporting a crank shaft, at least one of said ball bearings having an inner race slidable with respect to the crankshaft, said ball bearings having outer races connected directly or indirectly to said bracket and a plurality of steel balls disposed between said inner and outer races, and a coil spring extending around said shaft between said ball bearings for urging said inner race against said steel balls in each bearings.

The above and other objects and features of the present invention will be made apparent by the following description.

DESCRIPTION OF THE DRAWINGS

The present invention will be described in more detail with reference to the accompanying drawings in which.

DESCRIPTION OF PREFERRED EMBODIMENTS

Figure 1:
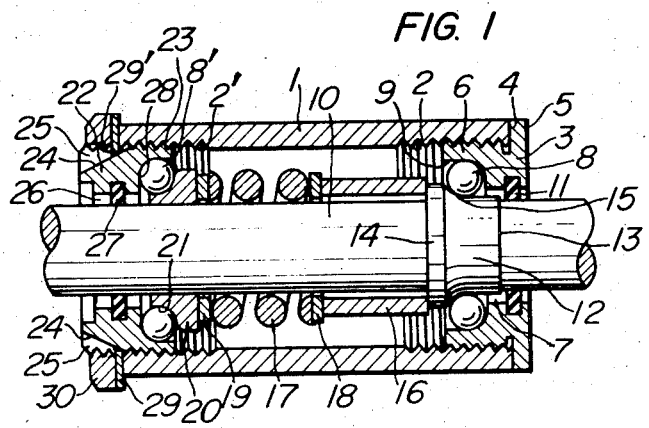
FIG. 1 is a longitudinal sectional view of a bottom bracket according to an embodiment of the present invention.

Referring first to FIG. 1, numeral 1 represents a bracket lug adapted to be connected by means of conventional welding or brazing to the bottom of a frame of a bicycle formed of tubings. The bracket lug 1 is formed with screw threads 2, 2' on the inner cylindrical surface adjacent the opposite ends thereof. A flanged cap 3 is threadably engaged with one of the screw threads 2, said one screw thread being seen at the right side of FIG. 1 in the instant embodiment. The flanged cap 3 is provided with a flange 5 in abutting engagement with an end face 4 of the bracket lug 1 and a threaded portion 6 in threadable engagement with the screw thread 2, said portion 6 being of a diameter smaller than that of the flage 5. The flanged cap 3 is also formed centrally thereof with a through-hole 7 for passing therethrough a crankshaft and with an annular concave recess 9 for receiving therein steel balls 8.

Numeral 10 indicates a crankshaft whose opposite ends are adapted to be fitted with cranks. Within the through-hole 7 is mounted an oil seal 11 which is in sealing engagement with the crankshaft 10 to prevent leakage of lubrication oil.

The crankshaft 10 is formed thereon with a ball bearing race 12 of a larger diameter for cooperating with the concave recess 9 of the cap 3 to press the balls 3 therebetween. The ball bearing race 12 has been formed by machining such as conventional cutting and has a stepped portion 13 of slightly larger diameter relative to the shaft 10 and a flage portion 14 of a diameter far larger than that of the stepped portion 13. An inwardly curved or concave spherical surface 15 is formed between the stepped and flange portions 13 and 14 to provide the bearing race 12 with a generally frustoconical shape. The right side bearing is composed of the flanged cap 3, steel balls 8 and the ball bearing race 12 formed on and integral with the crankshaft 10. It will be appreciated that the stepped portion 13 of the ball bearing race 12 may be omitted.

The crankshaft 10 positioned within the bracket lug extends loosely through a short sleeve member 16 with one end thereof in abutting engagement with the flange portion 14 of the ball bearing race 12. The other end of the sleeve member 16 is in abutting engagement with a circular spacer 18 which in turn is in engagement with one end of a coil spring 17 extending around the shaft 10, said coil spring having its inner diameter slightly larger than that of the shaft.

Another circular or ringlike spacer 19 is provided in pressure contact with the other end of the coil spring 17. The spacer 19 is positioned inwardly of a second ball bearing race 20 which constitutes a left side bearing slidably mounted on the peripheral surface of the crankshaft 10. The ball bearing race is in sliding contact with the shaft 10 and has a ringlike configuration formed therein with an inwardly depressed or concave annular steel ball bearing surface 21. An adjusting cap 22 is threadably fitted into the screw thread 2' at the left end of the bracket lug. The cap 22 is formed with a screw thread 23 on the periphery thereof and with two tapering grooves 25 each having an inclined surface 24 extending from generally central portion of the length of the cap 22 to the outer end face thereof.

Centrally of the adjusting cap 22 is formed a through-hole 26 through which the shaft 10 extends, as is in the case of the flanged cap 3. An oil seal 27 is provided at appropriately intermediate portion of the inner surface of the through-hole 26. The adjusting cap 22 is also formed with an annular concave recess 28 on the inner surface of the cap for receiving therein and bearing steel balls 8' which are arranged coaxially with the through-hole 26. A locking washer 29 is in abutting engagement with the left end face of the bracket lug 1. The washer 29 has inward projections 29' extending into the grooves 25 in the adjusting cap 22. A locking ring 30 is threadably engaged with the screw thread 23 on the peripheral surface of the adjusting cap 22 to lock the latter in proper position.

With the position shown in FIG. 1, the locking ring 30 is in engagement with the screw thread 23 on the cap 22 and, at the same time, urges the washer 29 against the left end face of the bracket lug 1. In addition, the locking washer 29 has its inward projections 29' positioned in the grooves 25 in the adjusting cap 22. Thus, the cap 22 will hardly or never be rotated from its fixed position adjusted at the time of assembly of the bracket lug 1 toward a loosened position of the adjusting cap 22.

With the above-described arrangement, the coil spring 17 is operable to bias through the spacer 19 the slidable ball bearing race 20 leftwardly against the steel balls 8' at the left end of the bracket lug 1. At the same time, the spring 17 also urges through the spacer 18 and the sleeve member 16 the ball bearing race 12, which is integral with the crankshaft 10, against the steel balls 8 at the right end of the bracket lug. Thus, the balls 8 are all held in pressure contact with the concave spherical surface 15 of the ball bearing race 12 and the concave annular surface of the recess 9 while the balls 8' are all in pressure contact with the concave annular bearing surface 21 of the ball bearing race 20 and the annular concave surface 28 of the adjusting cap 22, with the result that the load applied onto the crankshaft 10 is transmitted from the ball bearing races 12 and 20 to all of the steel balls 8 and 8'. This eliminates localized or irregular wear and flaking of the steel balls, the ball bearing races, the flanged cap and the adjusting cap which wear and flaking might otherwise be produced by the rotation of the crankshaft and the load imparted to only a part of the balls.

Figure 2:
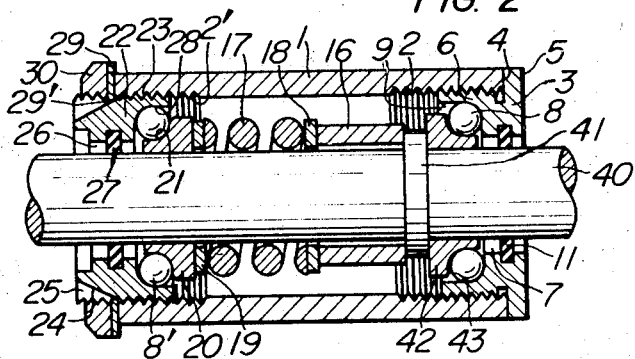
FIG. 2 is a similar view of a bottom bracket according to another embodiment of the invention.

FIG. 2 illustrates a modification of the embodiment shown in FIG. 1 that comprises a crankshaft having an integral ball bearing race. Namely, the embodiment of FIG. 2 includes a crankshaft 40 having formed on the part of the length of the shaft surrounded by the racket lug a flange 41 of rectangular cross section and of a diameter larger than that of the crankshaft 40. Disposed in contact with the right side face of the flange 41 is a ball bearing race 42 similar in configuration to the aforestated ball bearing race 20. The flange 41 serves to limit the axial movement of the ball bearing race 42 so that the latter is caused to act in the same manner as that of the ball bearing race 12 shown in FIG. 1. The ball bearing race 42 is formed with an annular concave recess 43 at the portion facing the balls 8 so that the balls are advantageously borne by the concave surface of the recess.

The bottom bracket shown in FIG. 2 may be easier to manufacture because the crankshaft 40 can e finished by forming the flange 41 only and because the same kind of bearing races can be used as both of the ball bearing races 20 and 42. In other words, the crankshaft 40 has formed thereon the flange 41 of simplified or rectangular cross section, which saves labors which will be otherwise required in forming the ball bearing race 12 of relatively complicated cross section on the crankshaft 10 of FIG. 1. The manufacture of the bottom bracket shown in FIG. 2 is consequently rendered easy and simplified.

Figure 3:
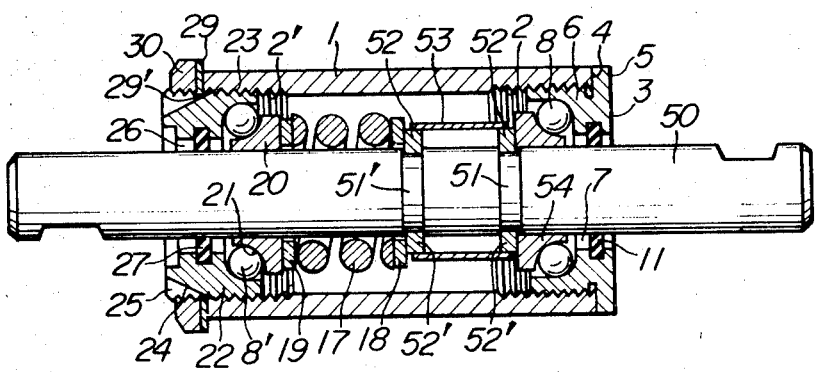
FIG. 3 is a similar view of a bottom bracket according to still another embodiment of the invention.

The bottom bracket shown in FIG. 3 has a crankshaft 50 which is formed in the periphery thereof with a pair of annular grooves 51 and 51' spaced a predetermined distance, for example 14 mm. Each of the grooves 51 and 51' receives therein a part of a pair of diametrically opposite semicircular retainer pieces 52 and 52' which cooperate together to form a ringlike assembly. The thus formed two pairs of ringlike assemblies are covered with a tubular sleeve 53 so that the latter may prevent the retainer pieces 52 and 52' from being removed or dropped off the grooves 51 and 51'.

The pair of retainer pieces 52 and 52' that are received in the right side groove 51 serves to limit axial movement of a ball bearing race 54 which is slidably mounted on the crankshaft 50 while the other pair of retainer pieces 52 and 52' received in the left side groove 51' bears against one end of the coil spring 17. The resiliency of the spring 17 is transmitted through the spacer 19 directly to the left ball bearing race 20 and through the spacer 18, the pair of retainer pieces 52 and 52' in the left groove 51', the portion of the shaft 50 extending between the opposite grooves 51 and 51' and through the pair of retainer pieces 52 and 52' in the right groove 51 to the right ball bearing race 54. Thus, the right and left sets of steel balls 8 and 8' in the right and left bearing portions are held under pressure between the flanged cap 3 and the ball bearing race 54 and between the adjusting cap 22 and the ball bearing race 20, respectively, by the resiliency of the coil spring 17 thereby to facilitate smooth rotation of the crankshaft 50.

The crankshaft 50 of the instant embodiment requires shorter machining work or less cutting steps than those required in making the crankshafts having thereon integral enlarged ball bearing races or flanges as shown in FIGS. 1 and 2 in that the crankshaft 50 may advantageously be manufactured by forming or cutting the grooves 51 and 51' in the periphery of a rod having a diameter the same as that of the shaft 50. This makes it possible in manufacturing the crankshaft 50 to employ or utilize a rod of a smaller diameter than that of the rod from which the crankshafts shown in FIGS. 1 and 2 are formed. In addition, the shaft 50 does not need hardening treatment and it is sufficient for the shaft to employ mass-produced retainer pieces and a sleeve to relatively easily retain the ball bearing race 54 and bear against the spring 17.

Figure 4:
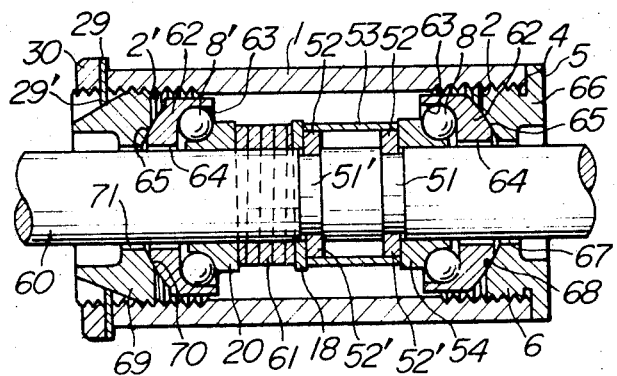
FIG. 4 is a similar view of a bottom bracket according to a further embodiment of the invention in which the crankshaft may be automatically centered with respect to the bearings.

FIG. 4 illustrates a further modification which enables a crankshaft to be automatically positioned coaxially with the bearing portions irrespective of the accuracy of the bracket lug so that all of the steel balls of the bearing portions are rotated between inner and outer ball bearing races under uniform pressures so as not to be subjected to any localized wear. Namely, the bracket lug shown in FIG. 4 employs a crankshaft 60 which is formed therein with a pair of annular grooves 51 and 51' for receiving therein pairs of retaining pieces 52 and 52' as is in the embodiment of FIG. 3. A coil spring 61 is disposed around the shaft 60 to outwardly bias the ball bearing races 20 and 54 which are positioned inwardly of the left and right bearing portions. The spring 61 may be made of a rod having circular cross section as shown in FIGS. 1 through 3 inclusive but, in the instant embodiment, is made of a rod having rectangular cross section as seen in FIG. 4. The bearing portions in this embodiment are composed of the inner ball bearing races 20 and 54, steel balls 8 and 8' and outer ball bearing races 62 and 62'.

The sides of the outer ball bearing races 62 and 62' facing the balls 8 and 8' are formed therein with outwardly concave annular ball bearing surfaces 63 and 63 while the other or outer sides of the ball bearing races 62 and 62' have outwardly bulging convex spherical surfaces 65 and 65 extending about through-holes 64 and 64 of a diameter larger than that of the crankshaft 60 for permitting the latter to extend therethrough.

The outer ball bearing race 62 of the right bearing section is bucked up or held by a flanged holder 66 which is secured to the bracket lug in the manner similar to that in which the flanged cap 3 in FIG. 1 is done. The flanged holder 66 does not have an annular concave recess identical in shape with the annular concave recess 9 in FIG. 1 for bearing the balls 8 but, instead, formed therein with an annular recess 68 having a concave spherical surface complementary to the convex spherical surface 65 of the aforesaid outer ball bearing race 62. The concave spherical surface of the recess 68 extends about a through-hole 67 of a diameter larger than that of the shaft 60 and is always kept in intimate contact with the convex spherical surface 65 of the outer ball bearing race 62 even if the latter is rotated.

On the other hand, an adjustable holder 69 for backing up the outer ball bearing race 62' of the left bearing portion is mounted on the bracket lug 1 in a manner similar to that in which the adjusting cap 22 of FIG. 1 is done. The holder 69 does not have an annular spherical surface identical with the spherical surface 28 of the adjusting cap 22 of FIG. 1 but, instead, is formed therein with a recess 70 having a concave spherical surface which is complementary to the outwardly bulging or projecting convex spherical surface 65 of the outer ball bearing race 62'. The holder 69 is also provided therein with a through-hole 71 for allowing the shaft to pass loosely therethrough.

As is apparent from the foregoing description, the right and left inner ball bearing races 54 and 20 are in close but sliding contact at their inner surfaces with the peripheral surface of the crankshaft 60 and, at the same time, in intimate smooth rolling contact at their annular outer concave surfaces with the steel balls 8 and 8', respectively, which in turn are in similar intimate and smooth rolling contact with the annular inner concave surfaces 63 and 63 of the outer ball bearing races 62 and 62', respectively. These ball bearing races 62 and 62' have outwardly bulging or projecting convex surfaces 65 and 65 which are in intimate contact with the annular complementary concave surfaces 68 and 68. This contacting relation enables the ball bearing races 62 and 62' to be laterally or radially rotated with respect to the holders 66 and 69 about the centers of the spherical surfaces 68 and 68 of the holders. The lateral or radial rotation of the ball bearing races 62 and 62' results in an unitary lateral adjusting movement of a crankshaft assembly with respect to the bracket lug 1 when the assembly is installed in the bracket lug, said crankshaft assembly comprising the shaft 60, inner and outer ball bearing races 54, 20, 62 and 62', balls 8 and 8', spring 61 etc. The through-holes 64, 67 and 71, which are formed in the outer ball bearing races 62 and 62' and in the holders 66 and 69, respectively, have their diameters each larger than the diameter of the crankshaft 60. This also enables said crankshaft assembly to have the aforesaid lateral adjusting movement. Thus, even if the axes of the flanged holder 66 and the adjustable holder 69 which are fitted into the bracket lug 1 are offset or not in axial registration with each other because of less accurate machining of these members, the offset of the axes of the holders may be taken up by the lateral adjusting movement of the crankshaft assembly and the crankshaft may be smoothly rotatably mounted in the bracket lug 1 in such a manner that the outer ball bearing races 62 and 62' are slightly laterally rotated with respect to the holders 66 and 69, respectively, and that the axis of the crankshaft is slightly displaced or tilted relative to the axis of the bracket lug 1. This also makes it possible that, even if the racket lug 1 should be so secured to the frame of the bicycle that the axis of the bracket lug is slightly offset from a predetermined angular position with respect to the vertical plane passing through the bicycle frame, the lateral adjusting movement of the crankshaft assembly adjusts the offset and, in operation, the crankshaft may be rotated with its axis disposed in said predetermined angular position.

In the instant embodiment, the holders 66 and 69 for holding the races 62 and 62' at the right and left ends of the bracket lug 1 are not provided with oil seals, but it is obvious to those skilled in the art that oil seals such as those 11 and 27 shown in FIG. 1 may be mounted in the through-holes 67 and 71 of the holders 66 and 69.

The preceding embodiment is remarkably advantageous in that the radially or laterally rotatable outer races may accurately correctly support the crankshaft in adjusted position.

Figure 5:
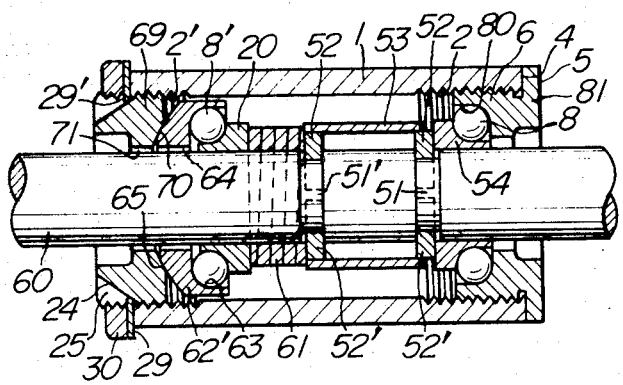
FIG. 5 is a longitudinal sectional view showing a modification of the bottom bracket shown in FIG. 4.

FIG. 5 illustrates a more simplified arrangement though this is slightly inferior in accuracy to the arrangement of the preceding embodiment. The embodiment shown in FIG. 5 has its left side bearing arrangement identical with the bearing arrangement in the embodiment of FIG. 4. The instant embodiment does not employ at the right side bearing portion a laterally rotatable outer race such as one 62 of FIG. 4 but, instead, is provided with a flanged cap 81 secured into the bracket lug. The cap 81 has an inner annular concave spherical surface 80, as is in the embodiment of FIG. 3, for bearing the steel balls 8 in a manner similar to that which has been described in connection with the embodiment shown in FIG. 3.

The flanged cap 81 in FIG. 5 is not provided with an oil seal but, in order to more advantageously prevent leakage of lubricant, an oil seal may be mounted in a through-hole 82 which is of a diameter larger than that of the shaft 60.

The coil spring 61 is held between the inner race 20 and the pair of retainer pieces 52 and 52' in compressed position. The spring, when removed from the bottom bracket, will expand axially so that a space is formed between each adjacent pair of turns of the coil.

Figure 6:
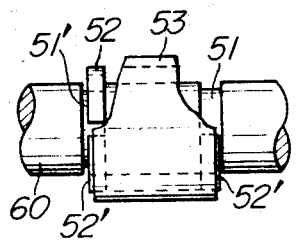
FIG. 6 is a fragmentary side view illustrating a part of the crankshaft shown in FIG. 5.
Figure 7:
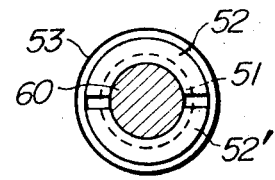
FIG. 7 is a cross-sectional front view of the crankshaft shown in FIG. 6.

FIG. 6 illustrates in more detail the manner in which the retainer pieces 52 and 52' are mounted on the shaft 60. The latter is formed in the periphery thereof with a pair of annular grooves 51 and 51' into each of which are fitted semicircular or C-shaped retainer pieces 52 and 52' to form a complete ring. The thus formed rings are held by a relatively shorter sleeve member 53 so as not to be removed or dropped off the grooves 51 and 51'. FIG. 7 illustrates one of the rings which is received in one of the grooves 51 and supported by the sleeve 53.

As having been described in the above, the bottom bracket for a bicycle according to the present invention is advantageous in that the coil spring around the crankshaft always outwardly urges the inner races against the steel balls to hold the latter in intimate rolling contact with the inner races and flanged cap and adjusting cap or outer races, with the result that the load imparted to the crankshaft is uniformly transmitted or distributed to all of the steel balls and, from thence, to the outer races and, further, to the caps of the bracket lug. Thus, the present invention can eliminate localized or irregular remarkable wear or flaking which otherwise would be produced on the steel balls and races and, further, on a part of the caps. Accordingly, the crankshaft can be mounted on bracket lug for smooth rotation and thus can have long operative life without any chattering.

We claim:

1. A bottom bracket for a bicycle, said bracket comprising a bracket lug; a flanged cap threadably fitted into one end of said bracket lug and having an inner side face provided therein with an annular ball bearing spherical recess, said cap being provided therein with a central through-hole; a crankshaft extending through said through-hole, said crankshaft having thereon a nonshiftable bearing race within said bracket lug having an annular ball bearing spherical recess in opposite relationship to said ball bearing recess in said flanged cap, said crankshaft further having thereon a shiftable bearing race biassed by a coil spring and having an annular ball bearing spherical recess, said coil spring extending around said crankshaft; an adjusting cap threadably fitted into the other end of said bracket lug and having an inner side face provided therein with an annular ball bearing spherical recess in opposite relationship to said ball bearing recess in said shiftable bearing race, said adjusting cap being formed therein with a through-hole through which said crankshaft extends; and sets of steel balls disposed between said annular ball bearing spherical recesses in said flanged cap and in said nonshiftable bearing race and between said annular ball bearing spherical recesses in said shiftable bearing race and in said adjusting cap, respectively, said coil spring biassing said shiftable bearing race in a direction in which the corresponding set of steel balls is urged against said adjusting cap.

2. A bottom bracket for a bicycle as defined in claim 1 in which said nonshiftable bearing race is a flangelike formation which is integral with said crankshaft.

3. A bottom bracket for a bicycle as defined in claim 1 in which said nonshiftable bearing race is formed by a slidable race member having therein an annular ball bearing spherical recess and by a flange formed on said crankshaft, said flange limiting axial movement of said slidable race member.

4. A bottom bracket for a bicycle, said bracket comprising a bracket lug; a flanged cap threadably fitted into one end of said bracket lug and having an inside face provided therein with an annular ball bearing spherical recess, said flanged cap having a central through-hole formed therein; a crankshaft extending through said through-hole in said flanged cap, said crankshaft being formed in the periphery thereof with a pair of annular grooves spaced a predetermined distance, said crankshaft having thereon retainer pieces fitted into each of said annular grooves, a bearing race slid over said crankshaft and having therein an annular ball bearing spherical recess in opposite relationship with said ball bearing recess in said flanged cap, the retainer pieces in one of said annular grooves retaining said bearing race against axial movement, a coil spring around said crankshaft having one end in pressure contact with the retainer pieces in the other groove, and a slidable earing race around the portion of said crankshaft outward of said coil spring, said slidable bearing race having an annular ball bearing spherical recess; an adjusting cap threadably fitted into the other end of said bracket lug, said adjusting cap having an inner face provided therein with an annular ball bearing spherical recess in opposite relationship with said ball bearing recess in said slidable bearing race, said adjusting cap further formed therein with a central through-hole through which said crankshaft extends; and sets of steel balls disposed between said annular ball bearing recesses in said flanged cap and in said first bearing race and between said annular ball bearing recesses in said adjusting cap and in said slidable bearing race, respectively, said coil spring biassing said slidable bearing race in a direction in which the corresponding set of steel balls is urged against said adjusting cap.

5. A bottom bracket for a bicycle, said bracket comprising a bracket lug; a flanged cap threadably fitted into one end of said bracket and having an inside face provided therein with an annular ball bearing spherical recess, said flanged cap having a central through-hole formed therein; a crankshaft extending through said through-hole in said flanged cap, said crankshaft being formed in the periphery thereof with a pair of annular grooves spaced a predetermined distance, said crankshaft having thereon retainer pieces fitted into each of said annular grooves, a bearing race slid over said crankshaft and having an annular ball bearing spherical recess in opposite relationship with said ball bearing recess in said flanged cap, the retainer pieces in one of said annular grooves retaining said bearing race against axial movement, a coil spring extending around said crankshaft and having one end in pressure contact with the retainer pieces in the other groove, and a slidable bearing race around the portion of said crankshaft outward of said coil spring, said slidable bearing race having therein an annular ball bearing spherical recess; an outer bearing race within said bracket lug having an inner face provided therein with an annular ball bearing spherical recess in opposite relationship with said slidable bearing race and having an outer face formed therein with an outwardly projecting convex surface; and sets of steel balls disposed between said annular ball bearing recesses in said flanged cap and in said first bearing race and between said annular ball bearing recesses in said outer bearing race and in said slidable bearing race, respectively, said outer bearing race being supported by a holder threadably fitted into the other end of said bracket lug, said holder having formed therein with a central through-hole of a diameter larger than that of said crankshaft for permitting the latter to extend therethrough and having an inner face formed therein with a spherical concave surface complementary to and in abutting engagement with said outwardly projecting convex surface of said outer bearing race, said coil spring biassing said slidable bearing race in a direction in which the corresponding set of steel balls is urged against said outer bearing race.

6. A bottom bracket for a bicycle as defined in claim 5 in which said flanged cap is replaced by a combination of a second holder and a second outer bearing race, said second holder being threadably fitted into said one end of said bracket lug and provided therein with a central through-hole of a diameter larger than that of said crankshaft for permitting the latter to extend therethrough, said second holder having an inner face formed therein with a spherical recess, said second outer bearing race having outwardly projecting convex spherical outer surface complementary to and in abutting engagement with said spherical recess in said second holder, said second outer bearing race further having an inner surface provided therein with an annular ball bearing spherical recess.

7. A bottom bracket for a bicycle as defined in claim 4 in which said retaining pieces fitted into each of said pair of annular grooves are a pair of semicircular pieces which cooperate together to form a ring over which a sleeve member is mounted to prevent removal of said retaining pieces from said annular grooves.